United States Patent
Kamiyama et al.

(10) Patent No.: US 7,673,266 B2
(45) Date of Patent: Mar. 2, 2010

(54) TIMING ANALYSIS METHOD AND APPARATUS, COMPUTER-READABLE PROGRAM AND COMPUTER-READABLE STORAGE MEDIUM

(75) Inventors: Masamichi Kamiyama, Kawasaki (JP); Tomoharu Awaya, Kawasaki (JP)

(73) Assignee: Fujitsu Microelectronics Limited, Yokohama (JP)

( * ) Notice: Subject to any disclaimer, the term of this patent is extended or adjusted under 35 U.S.C. 154(b) by 602 days.

(21) Appl. No.: 11/604,379

(22) Filed: Nov. 27, 2006

(65) Prior Publication Data

US 2007/0220467 A1  Sep. 20, 2007

(30) Foreign Application Priority Data

Feb. 27, 2006 (JP) .............................. 2006-050788

(51) Int. Cl.
*G06F 17/50* (2006.01)
(52) U.S. Cl. ..................................... 716/6; 716/4; 716/5
(58) Field of Classification Search ................. 716/4–6; 703/16
See application file for complete search history.

(56) References Cited

U.S. PATENT DOCUMENTS

| 6,684,375 | B2 * | 1/2004 | Tsukiyama et al. ............ 716/6 |
| 7,293,248 | B2 * | 11/2007 | Chang et al. .................... 716/6 |
| 7,469,394 | B1 * | 12/2008 | Hutton et al. ................... 716/6 |
| 2007/0113210 | A1 * | 5/2007 | Mizuno et al. .................. 716/5 |
| 2007/0156367 | A1 * | 7/2007 | Kucukcakar et al. ........ 702/123 |
| 2008/0072198 | A1 * | 3/2008 | Celik et al. ..................... 716/6 |

FOREIGN PATENT DOCUMENTS

JP  2002-279012  9/2002

* cited by examiner

*Primary Examiner*—Sun J Lin
(74) *Attorney, Agent, or Firm*—Staas & Halsey LLP

(57) ABSTRACT

A timing analysis method evaluates a performance of a target circuit that is to be designed, and includes calculating a correlation coefficient r between two arbitrary macro cells that are coupled and form the target circuit based on layout information including an arrangement of macro cells forming the target circuit and correlation information indicating a correlation between two macro cells that are coupled for each of arrangements of macro cell pairs, calculating a distribution function σ of a standard deviation of delay times of the two arbitrary macro cells based on the correlation coefficient σ, and carrying out a statistical timing analysis of the target circuit based on the correlation coefficient r and the distribution function σ of the standard deviation with respect to each of the macro cell pairs forming the target circuit.

13 Claims, 7 Drawing Sheets

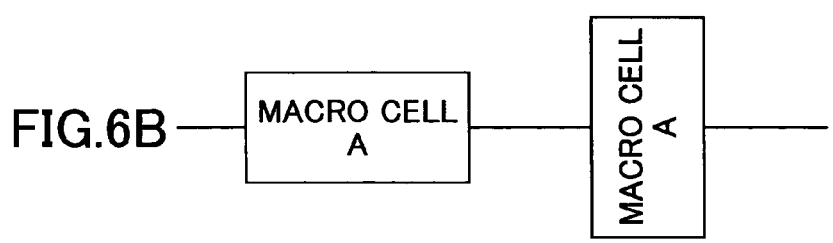
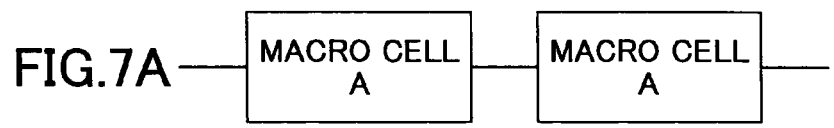
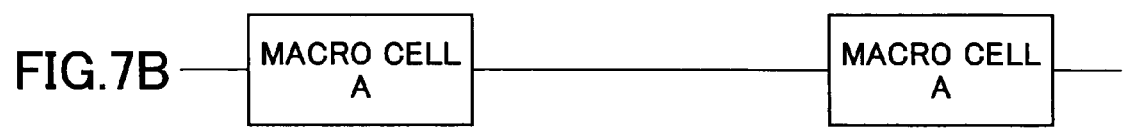

TIMING ANALYSIS METHOD AND APPARATUS, COMPUTER-READABLE PROGRAM AND COMPUTER-READABLE STORAGE MEDIUM

BACKGROUND OF THE INVENTION

1. Field of the Invention

The present invention generally relates to timing analysis methods and apparatuses, programs and storage media, and more particularly to a timing analysis method and a timing analysis apparatus for evaluating a performance of an integrated circuit when designing the integrated circuit such as an LSI, and to a computer-readable program and a computer-readable storage medium for causing a computer to carry out a timing analysis according to such a timing analysis method.

2. Description of the Related Art

According to the conventional timing analysis method employed in CAD or the like, the timing analysis is carried out by taking into consideration the worst case conditions of the delay times of all of the gates forming the integrated circuit that is to be designed. For example, if a macro cell A and a macro cell B forming the integrated circuit are connected, the macro cell A has an average delay time tA and a standard deviation $\sigma A$, and the macro cell B has an average delay time tB and a standard deviation $\sigma B$, a minimum worst case condition Min is represented by Min=tA+tB−3($\sigma A$+$\sigma B$), and a maximum worst case condition Max is represented by Max=tA+tB+3($\sigma A$+$\sigma B$).

By carrying out the timing analysis by taking into consideration the worst case conditions, it is possible to guarantee the operation of the integrated circuit.

A Japanese Laid-Open Patent Application No. 2002-279012 proposes a circuit evaluation method that calculates a delay distribution of an integrated circuit by taking into consideration a correlation relationship of the performances of wirings or elements of the integrated circuit.

However, when the timing analysis is always carried out by taking into consideration the worst case conditions of the delay times of the gates, it is necessary to set the operating margin of the gates to an extremely large value, and the operating margin of the integrated circuit that is finally designed becomes unnecessarily large. As a result, there were problems in that the degree of freedom of design of the integrated circuit deteriorates due to the unnecessarily large operating margin, and that the cost of the integrated circuit becomes high.

SUMMARY OF THE INVENTION

Accordingly, it is a general object of the present invention to provide a novel and useful timing analysis method and apparatus, computer-readable program and computer-readable storage medium, in which the problems described above are suppressed.

Another and more specific object of the present invention is to provide a timing analysis method, a timing analysis apparatus, a computer-readable program and a computer-readable storage medium, which can set the operating margin of the integrated circuit that is finally designed to an appropriate value, so that the degree of freedom of design of the integrated circuit can be improved and the cost of the integrated circuit can be reduced, by amounts corresponding to a difference between the appropriate value to which the operating margin is set and the conventional operating margin that is unnecessarily large.

Still another object of the present invention is to provide a timing analysis method for evaluating a performance of a target circuit that is to be designed, comprising a correlation calculating step calculating a correlation coefficient r between two arbitrary macro cells that are coupled and form the target circuit, based on layout information including an arrangement of macro cells forming the target circuit and correlation information indicating a correlation between two macro cells that are coupled for each of arrangements of macro cell pairs; a function calculating step calculating a distribution function $\sigma$ of a standard deviation of delay times of the two arbitrary macro cells that are coupled, based on the correlation coefficient $\sigma$; and an analyzing step carrying out a statistical timing analysis of the target circuit based on the correlation coefficient r and the distribution function $\sigma$ of the standard deviation with respect to each of the macro cell pairs forming the target circuit. According to the timing analysis method of the present invention, it is possible to set the operating margin of the circuit that is finally designed to an appropriate value, so that the degree of freedom of design of the circuit can be improved and the cost of the circuit can be reduced, by amounts corresponding to a difference between the appropriate value to which the operating margin is set and the conventional operating margin that is unnecessarily large.

A further object of the present invention is to provide a timing analysis apparatus for evaluating a performance of a target circuit that is to be designed, comprising a correlation calculating part configured to calculate a correlation coefficient r between two arbitrary macro cells that are coupled and form the target circuit, based on layout information including an arrangement of macro cells forming the target circuit and correlation information indicating a correlation between two macro cells that are coupled for each of arrangements of macro cell pairs; a function calculating part configured to calculate a distribution function $\sigma$ of a standard deviation of delay times of the two arbitrary macro cells that are coupled, based on the correlation coefficient $\sigma$; and an analyzing part configured to carry out a statistical timing analysis of the target circuit based on the correlation coefficient r and the distribution function $\sigma$ of the standard deviation with respect to each of the macro cell pairs forming the target circuit. According to the timing analysis apparatus of the present invention, it is possible to set the operating margin of the circuit that is finally designed to an appropriate value, so that the degree of freedom of design of the circuit can be improved and the cost of the circuit can be reduced, by amounts corresponding to a difference between the appropriate value to which the operating margin is set and the conventional operating margin that is unnecessarily large.

Another object of the present invention is to provide a computer-readable program for causing a computer to carry out a timing analysis to evaluate a performance of a target circuit that is to be designed, comprising a correlation calculating procedure causing the computer to calculate a correlation coefficient r between two arbitrary macro cells that are coupled and form the target circuit, based on layout information including an arrangement of macro cells forming the target circuit and correlation information indicating a correlation between two macro cells that are coupled for each of arrangements of macro cell pairs; a function calculating procedure causing the computer to calculate a distribution function $\sigma$ of a standard deviation of delay times of the two arbitrary macro cells that are coupled, based on the correlation coefficient $\sigma$; and an analyzing procedure causing the computer to carry out a statistical timing analysis of the target circuit based on the correlation coefficient r and the distribution function $\sigma$ of the standard deviation with respect to each of the macro cell pairs forming the target circuit. According to the computer-readable program of the present invention, it is possible to set the operating margin of the circuit that is finally designed to an appropriate value, so that the degree of freedom of design of the circuit can be improved and the cost of the circuit can be reduced, by amounts corresponding to a difference between the appropriate value to which the operating margin is set and the conventional operating margin that is unnecessarily large.

Still another object of the present invention is to provide a computer-readable storage medium which stores the computer-readable program described above. According to the computer-readable storage medium of the present invention, it is possible to set the operating margin of the circuit that is finally designed to an appropriate value, so that the degree of freedom of design of the circuit can be improved and the cost of the circuit can be reduced, by amounts corresponding to a difference between the appropriate value to which the operating margin is set and the conventional operating margin that is unnecessarily large.

Other objects and further features of the present invention will be apparent from the following detailed description when read in conjunction with the accompanying drawings.

BRIEF DESCRIPTION OF THE DRAWINGS

FIGS. 6A and 6B are diagrams for explaining a relationship of an arrangement of macro cells and correlation information;

FIGS. 7A and 7B are diagrams for explaining the relationship of the arrangement of macro cells and the correlation information;

DESCRIPTION OF THE PREFERRED EMBODIMENTS

Figure 1:
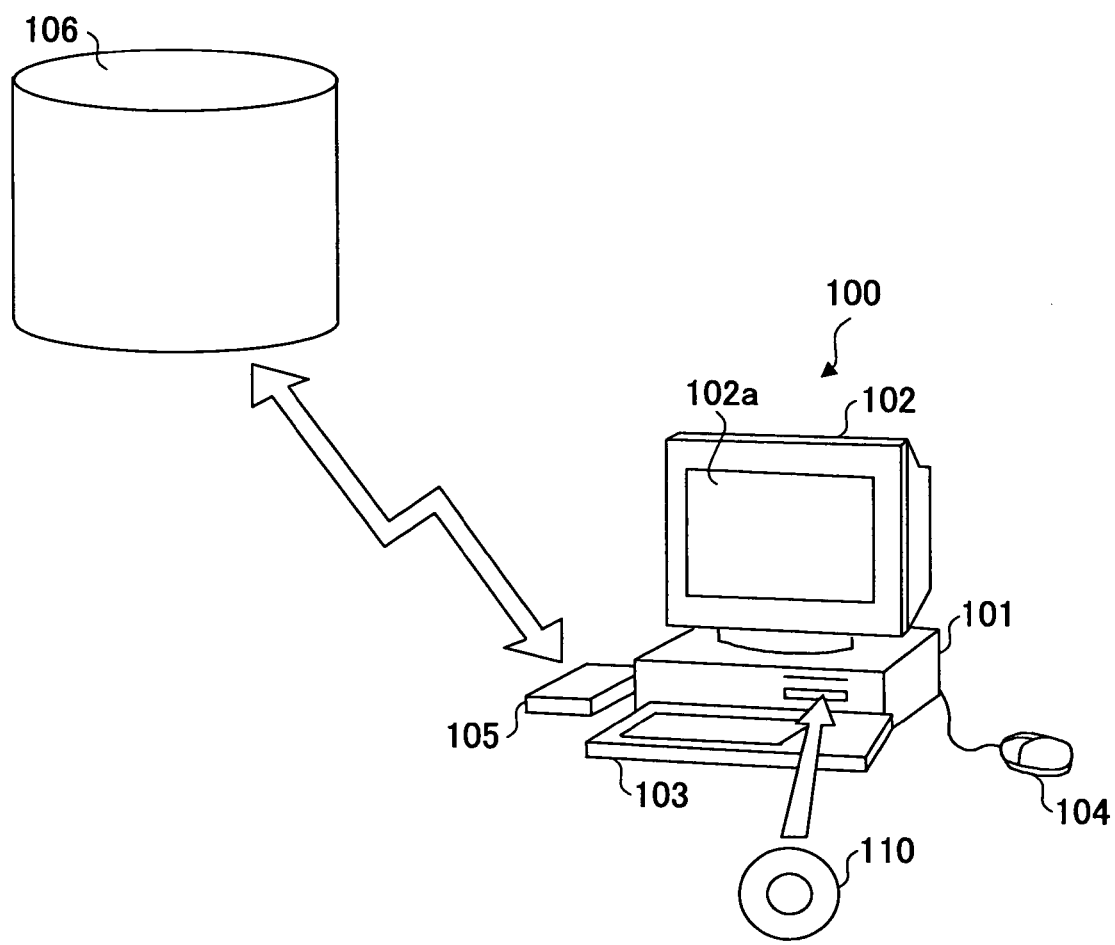
FIG. 1 is a perspective view showing a computer system applied with the present invention.

A description will be given of embodiments of a timing analysis method, a timing analysis apparatus, a computer-readable program and a computer-readable storage medium according to the present invention, by referring to the drawings.

An embodiment of the timing analysis apparatus according to the present invention employs an embodiment of the timing analysis method according to the present invention, an embodiment of the computer-readable program according to the present invention and an embodiment of the computer-readable storage medium according to the present invention. In this embodiment, the present invention is applied to a computer system. FIG. 1 is a perspective view showing the computer system applied with the present invention.

A computer system 100 shown in FIG. 1 has a main body part 101, a display 102, a keyboard 103, a mouse 104 and a modem 105. The main body part 101 includes a CPU, a disk drive and the like. The display 102 displays images on a display screen 102a in response to an instruction from the main body part 101. The keyboard 103 is used by a user to input various information to the computer system 100. The mouse 104 is used by the user to specify an arbitrary position on the display screen 102a of the display 102. The modem 105 makes access to an external database or the like and downloads programs and the like stored in another computer system.

The computer-readable program (CAD software or timing analysis software) of this embodiment for making the computer system 100 have a CAD function or at least a timing analysis function of the CAD function, which is stored in a portable recording medium such as a disk 110 or, downloaded from a recording medium 106 of another computer system using a communication unit such as the modem 105, is input to the computer system 100 and compiled therein. The program of this embodiment operates the computer system 100 (that is, a CPU 201 which will be described later) as the timing analysis apparatus of this embodiment having the CAD function. The computer-readable storage medium of this embodiment is formed by a computer-readable recording medium, such as the disk 110, that stores the program of this embodiment. The recording medium forming the computer-readable storage medium of this embodiment is not limited to portable recording media such as the disk 110, IC card memories, magnetic disks including floppy (registered trademark) disks, magneto-optical disks and CD-ROMs. The recording medium forming the computer-readable storage medium of this embodiment includes various recording media accessible by the computer system that is connected via the communication unit or communication means such as the modem 105 and the LAN.

Figure 2:
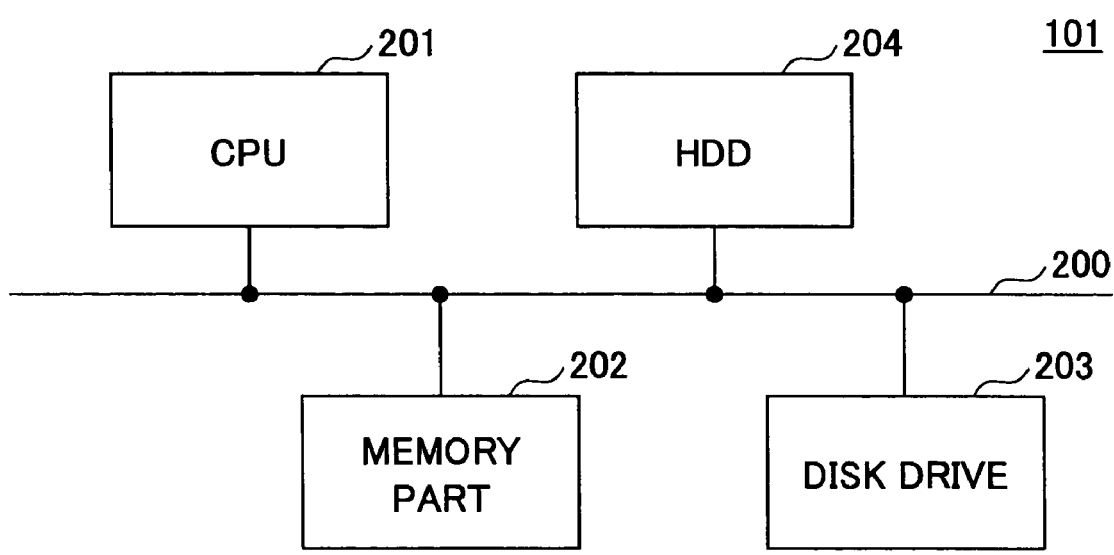
FIG. 2 is a system block diagram for explaining a structure of an important part within a main body part of the computer system.

FIG. 2 is a system block diagram showing an important part within the main body part 101 of the computer system 100 shown in FIG. 1. In FIG. 2, the main body part 101 includes a CPU 201, a memory part 202, a disk drive 203 and a hard disk drive 204 that are connected via a bus 200. The memory part 202 includes a RAM, a ROM and the like. The disk drive 203 is provided for the disk 110. In this embodiment, the display 102, the keyboard 103 and the mouse 104 are also connected to the CPU 201 via the bus 200, but it is of course possible to connect the display 102, the keyboard 103 and the mouse 104 directly to the CPU 201. In addition, the display 102 may be connected to the CPU 201 via a known graphic interface (not shown) that processes input and output image data.

Of course, the structure of the computer system 100 is not limited to the structure shown in FIGS. 1 and 2, and other known structures may be used instead.

Figure 3:
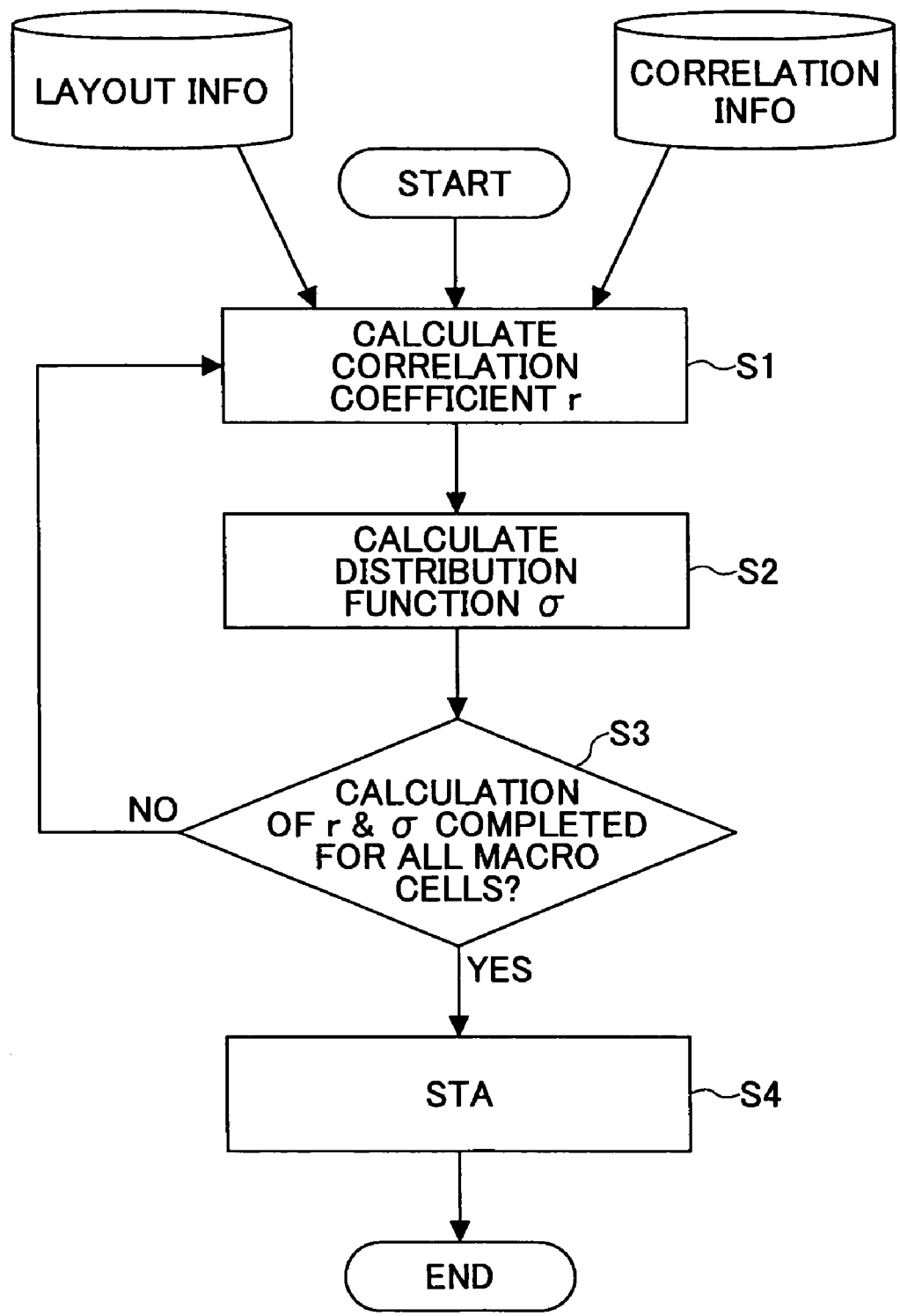
FIG. 3 is a flow chart for explaining an operation of an embodiment of the present invention.

FIG. 3 is a flow chart for explaining an operation of this embodiment of the present invention. Processes of steps S1 through S3 correspond to procedures of the program, and are executed by the CPU 201, that is, by corresponding parts or means of the computer system 100, with respect to a target integrated circuit that is to be designed, for example. It is assumed for the sake of convenience that layout information of the target integrated circuit and correlation information indicating a correlation of macro cells that are connected, are stored in a storage part or storage means such as the memory part 202 of the computer system 100 or, in an external database or the like. The layout information includes an arrangement (or layout) of the macro cells forming the target integrated circuit. The correlation information is stored for each of various arrangements (or layouts) of macro cell pairs. Of course, a layout information file or a layout information library, which is made up of the layout information, and a correlation information file or a correlation information library, which is made up of the correlation information, may be stored in the same storage part or storage means or, stored in different storage parts or storage means.

In FIG. 3, the step S1 reads the layout information of the macro cells within the target integrated circuit from the memory part 202 within the computer system 100, for example, reads the correlation information between the corresponding macro cells based on the layout information from the HDD 204 within the computer system 100, for example, and calculates a correlation coefficient r between two arbitrary macro cells that are connected within the target integrated circuit based on the correlation information. The step S2 calculates a distribution function σ of the standard deviation of the delay times of the two arbitrary macro cells that are connected based on the correlation coefficient r. The step S3 decides whether or not the calculation of the correlation coefficient r and the distribution function σ of the standard deviation of the delay times have been completed with respect to all macro cell pairs within the target integrated circuit. The process returns to the step S1 if the decision result in the step S3 is NO. On the other hand, if the decision result in the step S3 is YES, a step S4 carries out a statistical timing analysis (STA) with respect to the target integrated circuit based on the correlation coefficient r and the distribution function σ of the standard deviation of the delay times with respect to each of the macro cell pairs forming the target integrated circuit, and the process ends.

Figure 4:
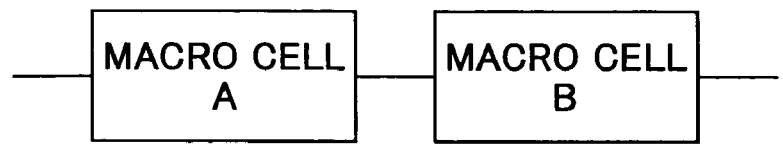
FIG. 4 is a diagram showing connected macro cells.
Figure 5:
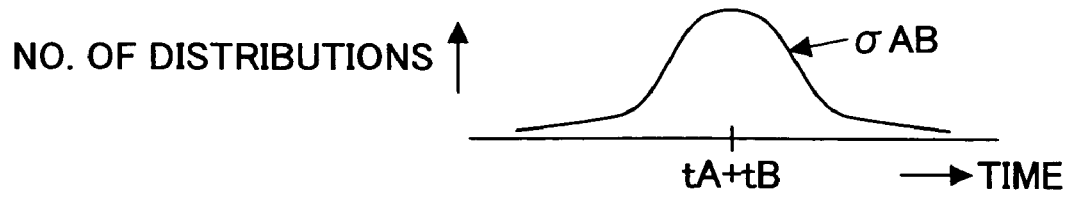
FIG. 5 is a diagram for explaining a distribution function representing delay times of the macro cells shown in FIG. 4.

For example, if a macro cell A and a macro cell B forming the target integrated circuit are connected, the macro cell A has an average delay time tA and a standard deviation σA, and the macro cell B has an average delay time tB and a standard deviation σB, the statistical timing analysis described above statistically treats the delay times of the macro cells A and B using a distribution function $\sigma_{AB}$ of a normal distribution or the like. For example, the delay times of the macro cells A and B shown in FIG. 4 are represented by a distribution function $\sigma_{AB}=(\sigma A^2+\sigma B^2+2r_{AB}\sigma A\sigma B)^{1/2}$ shown in FIG. 5, and a correlation coefficient $r_{AB}$ between the macro cells A and B is represented by a function $r_{AB}=f(x1, x2, \ldots, xn)$ that is determined by the layout and the like of the macro cells A and B. Accordingly, even in a case where the same macro cell B is connected to the macro cell A, if the macro cell B is arranged with an arrangement (or layout) different from that shown in FIG. 4 and this macro cell B having the different arrangement is represented by B', the delay times of the macro cells A and B' are represented by a distribution function $\sigma_{AB'}=(\sigma A^2+\sigma B'^2+2r_{AB'}\sigma A\sigma B')^{1/2}$, and a correlation coefficient $r_{AB'}$ between the macro cells A and B' does not become equal to the correlation coefficient $r_{AB}$ between the macro cells A and B ($r_{AB} \neq r_{AB'}$).

Next, a description will be given of the correlation information that is set depending on the arrangement of the macro cells and is stored in a correlation information file, by referring to FIGS. 6A through 11B. FIGS. 6A through 11B are diagrams for explaining the relationship of the arrangement (or layout) of the macro cells and the correlation information.

FIGS. 6A and 6B are diagrams for explaining the correlation between the macro cells for a case where two identical macro cells A are connected. FIG. 6A shows a case where the two macro cells A are connected with an arrangement (or layout) in which the two macro cells A have the same rotational angle (or angular orientation), and FIG. 6B shows a case where the two macro cells A are connected with an arrangement (or layout) in which the two macro cells A are connected with an arrangement (or layout) in which the two macro cells A have rotational angles (or angular orientations) that mutually differ by 90 degrees.

In the case shown in FIG. 6A, the inconsistencies in the characteristics of the two macro cells A due to the actual process of forming the macro cells A are such that the directions in which various layers such as wiring layers thickens, the directions in which the various layers thins, and the directions in which the positional errors of the various layers occur are approximately the same for the two macro cells A. Hence, in this case, correlation information indicating a strong correlation of the two macro cells A may be stored in the correlation information file or library.

On the other hand, in the case shown in FIG. 6B, the inconsistencies in the characteristics of the two macro cells A due to the actual process of forming the macro cells A are such that the directions in which various layers such as wiring layers thickens, the directions in which the various layers thins, and the directions in which the positional errors of the various layers occur are different for the two macro cells A. Hence, in this case, correlation information indicating a weak correlation of the two macro cells A may be stored in the correlation information file or library.

FIGS. 7A and 7B are diagrams for explaining the correlation between the macro cells for a case where two identical macro cells A are connected. FIG. 7A shows a case where the two macro cells A are connected with an arrangement (or layout) in which the two macro cells A are relatively close to each other, and FIG. 7B shows a case where the two macro cells A are connected with an arrangement (or layout) in which the two macro cells A are relatively distant from each other.

In the case shown in FIG. 7A, the inconsistencies in the characteristics of the two macro cells A due to the actual process of forming the macro cells A are approximately the same for the two macro cells A because the two macro cells A are relatively close to each other. Hence, in this case, correlation information indicating a strong correlation of the two macro cells A may be stored in the correlation information file or library.

On the other hand, in the case shown in FIG. 6B, the inconsistencies in the characteristics of the two macro cells A due to the actual process of forming the macro cells A are different for the two macro cells A because the two macro cells A are relatively distant from each other. Hence, in this case, correlation information indicating a weak correlation of the two macro cells A may be stored in the correlation information file or library.

For example, if the distance between the two macro cells A is denoted by D and correlation information exp(−D) is stored in the correlation information file, where a denotes a constant, the step S1 may calculate the correlation coefficient r based on a formula r=a·exp(−D), for example.

Figure 8A:
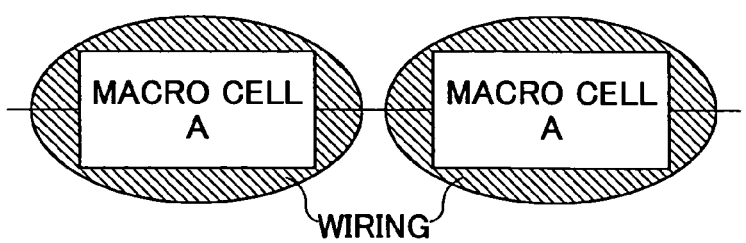
FIGS. 8A and 8B are diagrams for explaining the relationship of the arrangement of the macro cells and the correlation information.
Figure 8B:
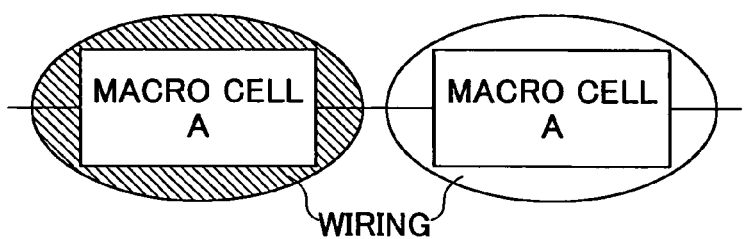

FIGS. 8A and 8B are diagrams for explaining the correlation between the macro cells for a case where two identical macro cells A are connected. FIG. 8A shows a case where the two macro cells A are connected with an arrangement (or layout) in which the occupying ratios of wirings surrounding the two macro cells A are the same, and FIG. 7B shows a case where the two macro cells A are connected with an arrangement (or layout) in which the occupying ratios of the wirings surrounding the two macro cells A are different.

In the case shown in FIG. 8A, the inconsistencies in the characteristics of the two macro cells A due to the actual process of forming the macro cells A are approximately the same for the two macro cells A because the interconnect capacitances (or wiring capacitances) caused by erosion are approximately the same for the two macro cells A. Hence, in this case, correlation information indicating a strong correlation of the two macro cells A may be stored in the correlation information file or library.

For example, the erosion is generated when forming an embedded wiring or the like by forming a wiring layer made of Cu or the like and planarizing the substrate surface by a chemical mechanical polishing (CMP), due to a difference between the polishing rates of the wiring layer and an insulator layer that causes the insulator layer to be removed by a larger amount at a portion where the wiring is concentrated as compared to a portion where the wiring is isolated.

On the other hand, in the case shown in FIG. 8B, the inconsistencies in the characteristics of the two macro cells A due to the actual process of forming the macro cells A are different for the two macro cells A because the interconnect capacitances (or wiring capacitances) caused by the erosion are different for the two macro cells A. Hence, in this case, correlation information indicating a weak correlation of the two macro cells A may be stored in the correlation information file or library.

Figure 9A:
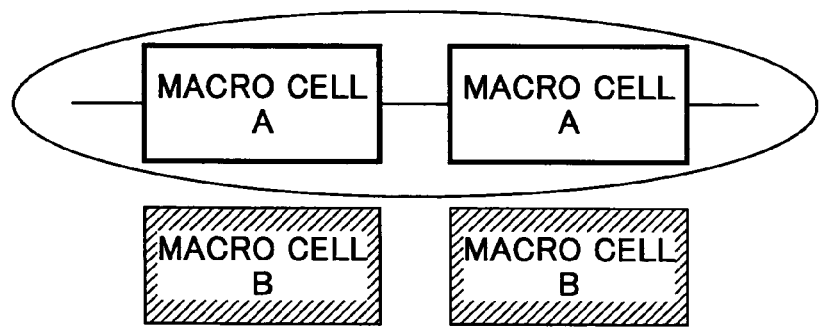
FIGS. 9A and 9B are diagrams for explaining the relationship of the arrangement of the macro cells and the correlation information.
Figure 9B:
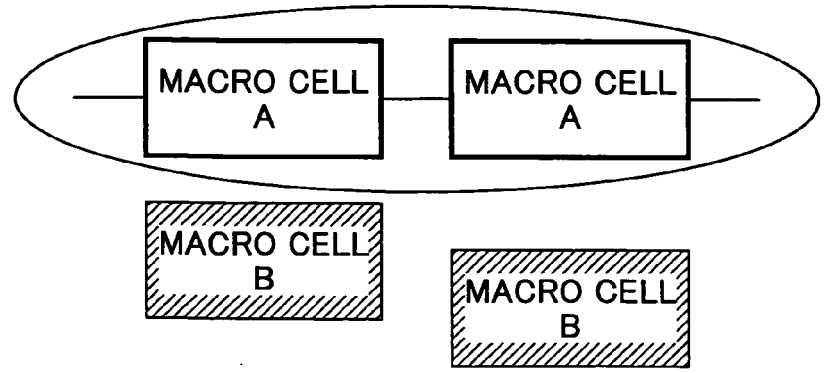

FIGS. 9A and 9B are diagrams for explaining the correlation between the macro cells for a case where two identical macro cells A are connected adjacent to two macro cells B. FIG. 9A shows a case where the two macro cells A are connected with an arrangement (or layout) in which the two macro cells A are separated by the same distance from the corresponding adjacent macro cells B, and FIG. 9B shows a case where the two macro cells A are connected with an arrangement (or layout) in which the two macro cells A are separated by different distances from the corresponding adjacent macro cells B.

In the case shown in FIG. 9A, the inconsistencies in the characteristics of the two macro cells A due to the actual process of forming the macro cells A are approximately the same for the two macro cells A because the stray capacitances of the two macro cells A are approximately the same. Hence, in this case, correlation information indicating a strong correlation of the two macro cells A may be stored in the correlation information file or library.

On the other hand, in the case shown in FIG. 9B, the inconsistencies in the characteristics of the two macro cells A due to the actual process of forming the macro cells A are different for the two macro cells A because the stray capacitances of the two macro cells A are different. Hence, in this case, correlation information indicating a weak correlation of the two macro cells A may be stored in the correlation information file or library.

Figure 10A:
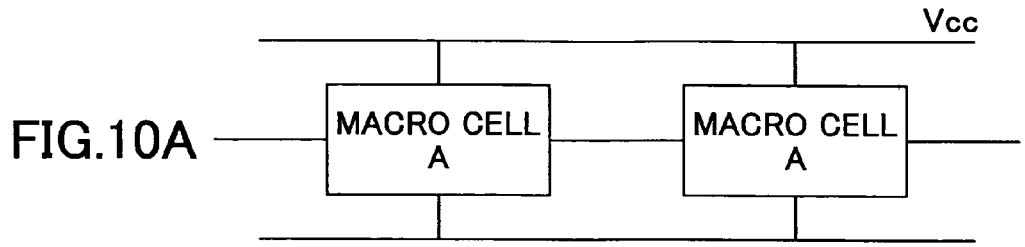
FIGS. 10A and 10B are diagrams for explaining the relationship of the arrangement of the macro cells and the correlation information.
Figure 10B:
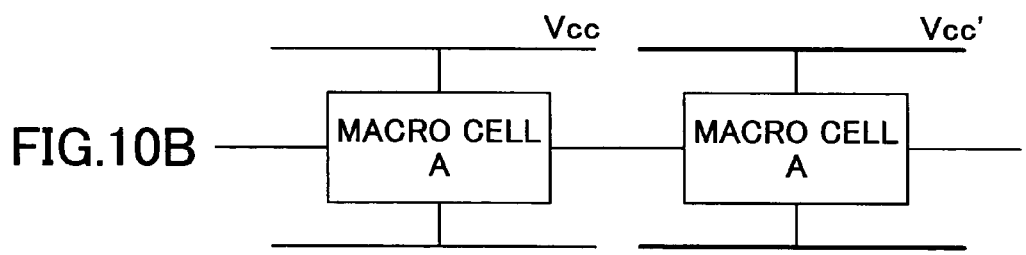

FIGS. 10A and 10B are diagrams for explaining the correlation between the macro cells for a case where two identical macro cells A are connected. FIG. 10A shows a case where the two macro cells A are connected with an arrangement (or layout) in which the two macro cells A are connected to the same power supply system (Vcc), and FIG. 10B shows a case where the two macro cells A are connected with an arrangement (or layout) in which the two macro cells A are connected to different power supply systems (Vcc and Vcc').

In the case shown in FIG. 10A, the fluctuations in the power supply voltages of the two macro cells A due to a fluctuation in the power supply system (Vcc) are approximately the same for the two macro cells A. Hence, in this case, correlation information indicating a strong correlation of the two macro cells A may be stored in the correlation information file or library.

On the other hand, in the case shown in FIG. 10B, the fluctuations in the power supply voltages of the two macro cells A due to a fluctuation in the power supply system (Vcc or Vcc') are different. Hence, in this case, correlation information indicating a weak correlation of the two macro cells A may be stored in the correlation information file or library.

Figure 11A:
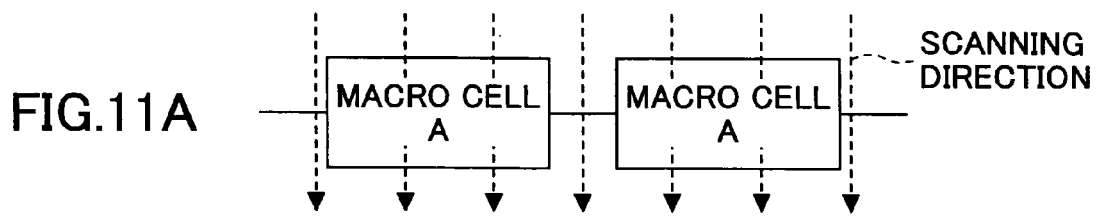
FIGS. 11A and 11B are diagrams for explaining the relationship of the arrangement of the macro cells and the correlation information.
Figure 11B:
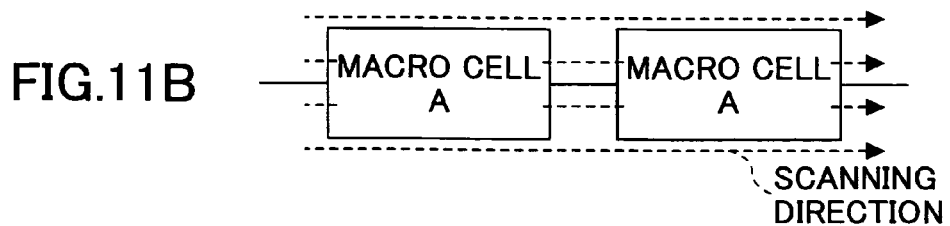

FIGS. 11A and 11B are diagrams for explaining the correlation between the macro cells for a case where two identical macro cells A are connected. FIG. 11A shows a case where the two macro cells A are connected with an arrangement (or layout) such that a scanning direction of an exposure mask used in the process of actually forming the two macro cells A is in a vertical direction as indicated by dotted lines in FIG. 11A with respect to the arrangement of the two macro cells A, and FIG. 11B shows a case where the two macro cells A are connected with an arrangement (or layout) such that the scanning direction of the exposure mask used in the process of actually forming the two macro cells A is in a horizontal direction as indicated by dotted lines in FIG. 11B with respect to the arrangement of the two macro cells A.

The characteristics of the macro cells A due to the actual process of forming the macro cells A differ between the two cases shown in FIGS. 11A and 11B for reasons similar to those described with respect to the cases shown in FIGS. 6A and 6B. Accordingly, correlation information indicating the mutually different correlations of the two macro cells A for the cases shown in FIGS. 11A and 11B may be stored in the correlation information file or library for the two cases shown in FIGS. 11A and 11B.

Of course, two or more setting methods of setting the correlation information may be arbitrarily selected and combined, from among the setting methods that set the correlation information depending on the arrangement (or layout) of the macro cells as described above in conjunction with FIGS. 6A through 11B. For example, the setting methods of setting the correlation information described above in conjunction with FIGS. 6A and 6B, FIGS. 7A and 7B and FIGS. 9A and 9B may be combined.

In addition, since the inconsistencies are generated in the characteristics of the macro cells due to the process of actually forming the macro cells as described above in conjunction with FIGS. 6A through 8B and FIGS. 11A and 11B, the correlation information may be set and stored in the correlation information file or library by taking into consideration the information related to the process of forming (or producing) the macro cells, in addition to the information related to the arrangement (or layout) of the macro cells.

This application claims the benefit of a Japanese Patent Application No. 2006-050788 filed Feb. 27, 2006, in the Japanese Patent Office, the disclosure of which is hereby incorporated by reference.

Further, the present invention is not limited to these embodiments, but various variations and modifications may be made without departing from the scope of the present invention.

What is claimed is:

1. A timing analysis method to be implemented in a computer for evaluating, by the computer, a performance of a target circuit that is to be designed, comprising;
   calculating, by the computer, a correlation coefficient r between two arbitrary macro cells that are coupled and form the target circuit, based on layout information including an arrangement of macro cells forming the target circuit and correlation information indicating a correlation between two macro cells that are coupled for each of arrangements of macro cell pairs;

calculating, by the computer, a distribution function σ of a standard deviation of delay times of the two arbitrary macro cells that are coupled, based on the correlation coefficient r; and carrying out a statistical timing analysis of the target circuit, by the computer, based on the correlation coefficient r and the distribution function σ of the standard deviation with respect to each of the macro cell pairs forming the target circuit.

2. The timing analysis method as claimed in claim 1, wherein the calculating the correlation coefficient r reads the correlation information with respect to the arrangement of the two arbitrary macro cells that are coupled, from a correlation information file that stores the correlation information, based on the layout information, and calculates the correlation coefficient r from the read correlation information.

3. The timing analysis method as claimed in claim 2, wherein the correlation information is stored in the correlation information file depending on at least one information that is related to the arrangement and is selected from a group consisting of:

a rotational angle of one of the two arbitrary macro cells with respect to the other of the two arbitrary macro cells;

a distance between the two arbitrary macro cells;

occupying ratios of wirings surrounding each of the two arbitrary macro cells;

distances between each of the two arbitrary macro cells and corresponding macro cells;

power supply systems coupled to each of the two arbitrary macro cells; and a scanning direction of an exposure mask used in a process of actually forming the two arbitrary macro cells with respect to the arrangement of the two arbitrary macro cells.

4. The timing analysis method as claimed in claim 2, wherein the correlation information is stored in the correlation information file by taking into consideration information related to a process of forming the macro cells, in addition to information related to the arrangement of the macro cells.

5. A timing analysis apparatus for evaluating a performance of a target circuit that is to be designed, comprising:

a correlation calculating part configured to calculate a correlation coefficient r between two arbitrary macro cells that are coupled and form the target circuit, based on layout information including an arrangement of macro cells forming the target circuit and correlation information indicating a correlation between two macro cells that are coupled for each of arrangements of macro cell pairs;

a function calculating part configured to calculate a distribution function σ of a standard deviation of delay times of the two arbitrary macro cells that are coupled, based on the correlation coefficient r; and an analyzing part configured to carry out a statistical timing analysis of the target circuit based on the correlation coefficient r and the distribution function σ a of the standard deviation with respect to each of the macro cell pairs forming the target circuit.

6. The timing analysis apparatus as claimed in claim 5, wherein the correlation calculating part reads the correlation information with respect to the arrangement of the two arbitrary macro cells that are coupled, from a correlation information file that stores the correlation information, based on the layout information, and calculates the correlation coefficient r from the read correlation information.

7. The timing analysis apparatus as claimed in claim 6, wherein the correlation information is stored in the correlation information file depending on at least one information that is related to the arrangement and is selected from a group consisting of:

a rotational angle of one of the two arbitrary macro cells with respect to the other of the two arbitrary macro cells;

a distance between the two arbitrary macro cells;

occupying ratios of wirings surrounding each of the two arbitrary macro cells;

distances between each of the two arbitrary macro cells and corresponding macro cells;

power supply systems coupled to each of the two arbitrary macro cells; and a scanning direction of an exposure mask used in a process of actually forming the two arbitrary macro cells with respect to the arrangement of the two arbitrary macro cells.

8. The timing analysis apparatus as claimed in claim 6, wherein the correlation information is stored in the correlation information file by taking into consideration information related to a process of forming the macro cells, in addition to information related to the arrangement of the macro cells.

9. A computer-readable program for causing a computer to carry out a timing analysis to evaluate a performance of a target circuit that is to be designed, comprising:

a correlation calculating procedure causing the computer to calculate a correlation coefficient r between two arbitrary macro cells that are coupled and form the target circuit, based on layout information including an arrangement of macro cells forming the target circuit and correlation information indicating a correlation between two macro cells that are coupled for each of arrangements of macro cell pairs;

a function calculating procedure causing the computer to calculate a distribution function σ of a standard deviation of delay times of the two arbitrary macro cells that are coupled, based on the correlation coefficient r; and an analyzing procedure causing the computer to carry out a statistical timing analysis of the target circuit based on the correlation coefficient r and the distribution function σ of the standard deviation with respect to each of the macro cell pairs forming the target circuit.

10. The computer-readable program as claimed in claim 9, wherein the correlation calculating procedure causes the computer to read the correlation information with respect to the arrangement of the two arbitrary macro cells that are coupled, from a correlation information file that stores the correlation information, based on the layout information, and calculates the correlation coefficient r from the read correlation information.

11. The computer-readable program as claimed in claim 10, wherein the correlation information is stored in the correlation information file depending on at least one information that is related to the arrangement and is selected from a group consisting of:

a rotational angle of one of the two arbitrary macro cells with respect to the other of the two arbitrary macro cells;

a distance between the two arbitrary macro cells;

occupying ratios of wirings surrounding each of the two arbitrary macro cells;

distances between each of the two arbitrary macro cells and corresponding macro cells;

power supply systems coupled to each of the two arbitrary macro cells; and a scanning direction of an exposure mask used in a process of actually forming the two arbitrary macro cells with respect to the arrangement of the two arbitrary macro cells.

12. The computer-readable program as claimed in claim 10, wherein the correlation information is stored in the correlation information file by taking into consideration information related to a process of forming the macro cells, in addition to information related to the arrangement of the macro cells.

13. A computer-readable storage medium which stores the computer-readable program as claimed in claim 9.

* * * * *

UNITED STATES PATENT AND TRADEMARK OFFICE
CERTIFICATE OF CORRECTION

| | |
|---|---|
| PATENT NO. | : 7,673,266 B2 |
| APPLICATION NO. | : 11/604379 |
| DATED | : March 2, 2010 |
| INVENTOR(S) | : Masamichi Kamiyama |

It is certified that error appears in the above-identified patent and that said Letters Patent is hereby corrected as shown below:

Column 8, Line 63, change "comprising;" to --comprising:--.

Column 9, Line 59, before "of the" delete "a".

Signed and Sealed this

Thirtieth Day of November, 2010

David J. Kappos
*Director of the United States Patent and Trademark Office*